March 27, 1951     T. G. PRENTICE     2,546,614
FISHING LURE
Filed Jan. 10, 1950

INVENTOR.
Thomas G. Prentice.
BY
Stanley Lightfoot
Attorney.

Patented Mar. 27, 1951

2,546,614

UNITED STATES PATENT OFFICE 2,546,614

FISHING LURE

Thomas G. Prentice, Detroit, Mich.

Application January 10, 1950, Serial No. 137,770

2 Claims. (Cl. 43—35)

This invention relates to fishing lures or plugs such as of the type described in Patent No. 2,470,861 granted to me May 24, 1949, and has for its object to provide a simplified arrangement wherein the sliding of the body of the lure over the shank of a hook may be controlled by a simple spring or biased latch carried by one of the relatively reciprocal elements of the lure and positioned to lock the body in its shank-encircling position, the said latch being sensitive to a rearward pull on the said body to release the latch when the body is taken by a fish, whereby a resulting forward movement of said body under spring influence will result in the entire hook and its shank being projected rearwardly of the said body into the mouth of the fish.

The said invention contemplates the provision of a rod having means for attachment of a fishing line at the forward end and a hook having its shank linked to the rear end of said rod; a tubular body reciprocal on said rod and normally urged by a spring to a forward position free of the shank of said hook but movable rearwardly against the resistance of that spring to a position encircling said shank; and a spring latch carried by one of said relatively reciprocal parts and adapted to lock them together when said body is drawn to its rearward shank-encircling position, said latch being adapted to release upon the further movement of said body rearwardly of its latched position, as by the pull of a fish having grasped the same.

This invention further contemplates providing such a latch in the form of a lip of spring material extending outwardly at the forward end of the body of the lure, to act as a wobble-producing baffle, and having a leaf extension from its outer end positioned to be pressed into engagement with a recess or stop on said rod when the body is moved to its shank-encircling position, said leaf extension being biased, as by the resilience of its material, about a point whereby it will spring free of its latching position when said body is moved to a rearward point beyond its normal latched position.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein.

Similar characters of reference indicate similar parts in the several figures of the drawing.

Figure 1:
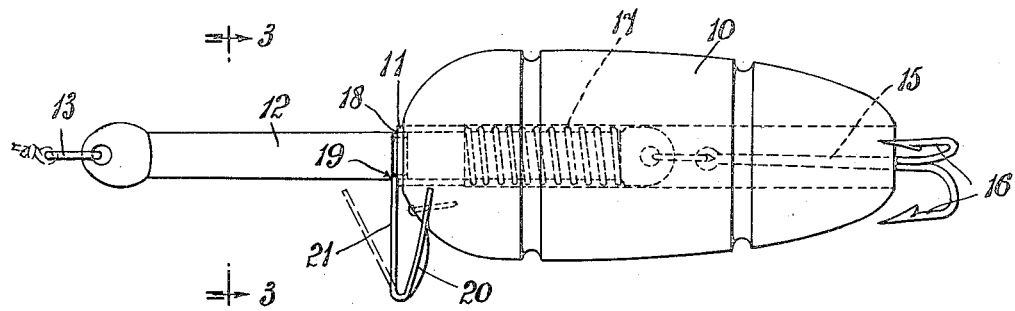
Figure 1 is an elevation of a lure embodying the said invention.

10 indicates the body or plug proper of the lure, which is tubular and may be of any desirable outer shape, the said body having a short sleeve or liner 11 secured in the forward end of the bore to slidably accommodate a rod 12.

This rod 12 is shown as being provided with a link 13 at its forward end for the attachment thereto of a fishing line and a link 14 at its rear end to which is attached the elongated shank 15 of a fish hook having barbs 16 of the well known type.

The body 10 is urged forwardly of the rod 12 by the compression spring 17 encircling the said rod and bearing at one end against the fixed sleeve 11 and at the other end against an expanded rear portion of the rod which forms the eye for receiving the link 14.

As shown in Figure 1, the body 10 may thus be drawn rearwardly of the rod 12 against the resistance of the spring 17 to extend over and encircle the shank 15 of the fish hook, and the said rod 12 is shown as being provided with a recess 18 intermediate of its length and positioned to be exposed ahead of the front end of the said body 10 when the said body is so moved to the rearward position of Figure 1.

Figure 2:
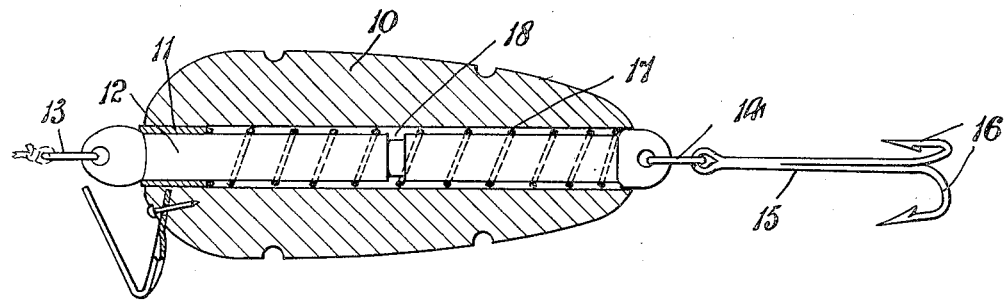
Figure 2 is a longitudinal sectional view of the same.
Figure 3:
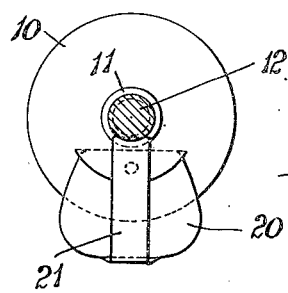
Figure 3 is a front elevation of the same.

The slot 18 thus provides a shoulder or stop 19 on the said rod 12 adapted to be engaged by a latch 1, in Figures 1, 2 and 3, and is shown as being in the form of a lip or baffle plate 20 of spring material extending outwardly (and downwardly as viewed in the drawing) of the forward end portion of the body 10, this baffle plate 20 being provided with a leaf extension 21 doubled upon the said plate toward the said rod 12 to form a U-shaped spring member and of a length whereby it is free and may be pressed into the recess 18 of the rod 12 and thereby engage the shoulder 19, in the manner shown in Figure 1, to latch the body 10 in its position of rearward adjustment on the rod.

It should be noted that this position of rearward adjustment of the body 10 falls somewhat short of the total extent to which the said body may be moved against the compression spring 17 (and toward the barbs 16 of the fish hook), so that, when the said body is grasped by a fish, the resulting pull may move the body 10 still further rearwardly against the said barbs 16 of the fish hook, thus projecting the stop 19 forwardly of the front end of the said body to such an extent that the said stop 19 is moved beyond the reach of the end of the latching spring leaf 21. The leaf 21 is then consequently free to spring forwardly and outwardly from the recess 18, as shown in dotted lines in Figure 1 and in full lines in Figure 2, thus releasing the said body 10 and permitting it to move forwardly over the rod 12 to the position shown in Figure 2. This, of course, results in the body 10 being entirely withdrawn from about the shank of the hook, which thus remains within the mouth of the fish and is free to perform its snaring function.

While I prefer to form the portion of the U-shaped spring latch as a baffle plate in order that it may perform the dual function of a baffle and a latch, it may be of any convenient configuration, even dispensing with the baffle effect if so desired, as in cases where provision for a wobble action in the lure may not be deemed necessary.

This invention may be developed within the scope of the following claims without departing from the essential features of the said invention, and it is desired that the specification and drawing be read as being merely illustrative of a practical embodiment of the same and not in a strictly limiting sense.

What I claim is:

1. In a fishing lure, a rod adapted for line attachment at its front end, a barbed hook having an elongated shank linked to the rear end of said rod, a tubular body slidable longitudinally over said rod and said shank, a spring urging said body forwardly of said rod, stop means on said rod, and latch means for engaging said stop means in a position of partial rearward adjustment on said body wherein the rear end of said body is in close but spaced relation to the barbs of said hook, said latch means comprising a U-shaped spring member having one leg attached to said body and the other leg positioned to be manually pressed into engagement with said stop means, said last-mentioned leg being proportioned for release by the further rearward movement of said body toward said barbs.

2. In a fishing lure, a rod adapted for line attachment at its front end, a barbed hook having an elongated shank linked to the rear end of said rod, a tubular body slidable longitudinally over said rod and said shank, a spring urging said body forwardly of said rod, stop means on said rod, a depending baffle plate on the forward end of said body, and a spring leaf extending from the outer end of said plate for engaging said stop means in a position of partial rearward adjustment on said body wherein the rear end of said body is in close but spaced relation to the barbs of said hook, said leaf being positioned to be manually pressed into engagement with said stop means and proportioned for release by the further rearward movement of said body toward said barbs.

THOMAS G. PRENTICE.

REFERENCES CITED

The following references are of record in the file of this patent:

UNITED STATES PATENTS

| Number | Name | Date |
| --- | --- | --- |
| 2,470,861 | Prentice | May 24, 1949 |